(12) United States Patent
Mateus et al.

(10) Patent No.: US 6,739,451 B2
(45) Date of Patent: May 25, 2004

(54) METHOD AND APPARATUS FOR THE STORAGE, DISPLAY AND RETRIEVAL OF FLAT MEDIA

(76) Inventors: Victor M. A. Mateus, 1358 Ladner Road, Kelowna, British Columbia (CA), V1W 3M7; Rene J. Barone, 1756 Duncan Avenue E., Penticton, British Columbia (CA), V2A 7E7

( * ) Notice: Subject to any disclaimer, the term of this patent is extended or adjusted under 35 U.S.C. 154(b) by 57 days.

(21) Appl. No.: 10/170,695

(22) Filed: Jun. 14, 2002

(65) Prior Publication Data

US 2003/0006164 A1 Jan. 9, 2003

Related U.S. Application Data

(60) Provisional application No. 60/297,790, filed on Jun. 14, 2001.

(51) Int. Cl.[7] .............................................. B65D 85/57
(52) U.S. Cl. ..................................... 206/311; 211/41.12
(58) Field of Search ............................... 206/308.1, 311, 206/312, 473; 312/9.53, 9.56, 9.58, 9.61; 211/41.12; 289/29, 31, 36

(56) References Cited

U.S. PATENT DOCUMENTS

| | | | |
|---|---|---|---|
| 4,778,047 A | * | 10/1988 | Lay |
| 5,555,977 A | | 9/1996 | Oshry et al. |
| 5,588,528 A | | 12/1996 | Ozeki |
| 5,624,169 A | * | 4/1997 | Bishop, Jr. |
| 5,715,937 A | | 2/1998 | Oshry et al. |
| 6,073,764 A | * | 6/2000 | Haas et al. |
| 6,325,207 B2 | | 12/2001 | Drew |
| 6,332,546 B1 | * | 12/2001 | Hunt |

* cited by examiner

Primary Examiner—David T. Fidei
(74) Attorney, Agent, or Firm—Antony C. Edwards (57) ABSTRACT

A system for storage, display, retrieval and transportation of flat media includes a base having an upper flat top surface. A pair of diverging rigid wings mount into a pair of slots selected form a laterally extending array of slots across the top surface of the base. At least one clamp for clamping common side edges of flat media storage ages is releasably mountable onto the top surface of the base between the pair of wings so as to provide for expandable storage of clamped packets of storage pages. A clamped packet of storage pages is also releasably mountable into a more readily portable transportation device such as a wallet.

16 Claims, 7 Drawing Sheets

METHOD AND APPARATUS FOR THE STORAGE, DISPLAY AND RETRIEVAL OF FLAT MEDIA

CROSS REFERENCE TO RELATED APPLICATION

This application claims priority from U.S. Provisional Patent Application No. 60/297,790 filed Jun. 14, 2001 entitled Flat Media Storage and Retrieval Device.

FIELD OF THE INVENTION

This invention relates to a flat media, such as a compact disk, DVD, or photograph, storage display and retrieval device, and method of use of same, and in particular to a system for the storage, display and retrieval of flat media including a rigid support having outwardly biased rigid support wings for retaining removably mounted therebetween packets of storage pages, the pages having storage pockets mounted on pages.

BACKGROUND OF THE INVENTION

The use of compact disks (CD's) containing computer programs, music or full length movies are quite common in most homes and businesses. The compact disks are generally contained within a hard, fragile, protective case which identifies the contents. Often the protective case does not permit easy visual determination if the compact disk has been removed.

The protective case has been found to present some difficulty with the ease in which the compact disk medium can be identified, stored or retrieved. Some relief from this difficulty has resulted in the use of storage holders containing a plurality of pages, each of which contain several transparent pockets within which the compact disk itself, that is, minus the protective case, can be stored. Such storage holders are generally in a book or wallet design with a fixed number of pages, thus prohibiting the user from conveniently adding extra storage pages. Such compact disk storage holders in use generally lie open, substantially parallel to the surface upon which they are placed. Such orientation makes the storage pages subject to reflected light which will obscure the identification of the compact disk. In many cases when the storage holder is left in an open position the storage pages will tumble over, that is, bias to a closed position such as if the wallet was closed, making reinsertion of the compact disk into its proper pocket difficult without the use of both hands.

It is an object of this invention to provide in one embodiment a flat media storage, display and retrieval system which includes rigid support structure having a slanted or sloped top surface in which one or more pairs of clamps may be releasably mounted, the pair of clamps readily adjustable to releasably secure together a plurality of separate storage pages containing storage pockets for retaining and displaying flat media such as compact disks, and where such pairs of clamps, and the pages secured therein, are readily removable either for retrieval of the stored flat media or for convenient separate transportation.

It is a further object of this invention to provide in another embodiment the rigid support structure having one or more selectively laterally-positionable, laterally outwardly projecting supporting wings for supporting the storage pages when laid open so that the pages may be easily riffled for review, selection and retrieval of the desired flat media.

It is yet a further object to adapt the storage pages to hold flat media such as, and without intending to be limiting, photographs, CDs, digital versatile or video discs (DVDs), collectibles such as postal stamps, hockey cards and the like, and to provide portable caddy's, wallets and the like forming a convenient system for same.

SUMMARY OF THE INVENTION

The flat media storage, display and retrieval system of the present invention includes a rigid support structure on which are releasably mounted one or more pairs of page clamps, where each pair of page clamps releasably clamp a plurality of storage pages in the manner of a book binding.

The support structure may be manufactured from plastic or other rigid material, and may have a base with a sloped rigid planar top surface supported at a slant relative to a horizontal surface, such as a table top or the like. The top surface may be supported by downwardly projecting legs secured to the underside of the top surface. Each leg may be generally an acute triangular shape where the hypotenuse supports the planar top surface, in one embodiment at an incline of approximately thirty degrees.

The top surface may be for example either a square or rectangular shape and may have laterally spaced apart array of parallel slots aligned generally perpendicular to upper and lower supporting flanges mounted horizontally across opposite upper and lower edges of the top surface. The slots terminate inwardly, that is, short of the upper and lower edges of the top surface. A strip of retaining material such as Velcro™ may be positioned adjacent to the upper and lower terminal ends of the slots or may extend therebetween. The upper and lower supporting flanges may be retaining bars positioned adjacent to the upper and lower edges of the top surface. The upper supporting flange or retaining bar may have an inwardly projecting retaining lip.

A pair of rigid or semi-rigid supporting wings may be selectively releasably inserted into the spaced apart slots formed in the top surface. The supporting wings may be rigid sheets having a short first leg for insertion into a slot leaving a longer, contiguous, second leg cantilevered over the top surface for supporting the pages. The first and second legs of the wings may be for example formed with an included angle of generally thirty to forty degrees between their respective planes. The first leg may be of a depth which permits it to extend fully through the slots in the top surface and into the base, and sized so as to be slightly less than the length of the corresponding slot. The second leg may be sized so as to extend the edges of the second leg into proximity with the upper and lower retaining bars.

When the first legs of each wing are properly mounted within a pair of spaced apart slots, the second legs will project upwardly and diverge laterally outwardly from the top surface to create opposed facing inclined and stable page-supporting faces diverging away from each other above the top surface.

Clamps, for example manufactured from a pair of flat, rigid rectangular members, in one embodiment, having mating apertures adjacent each end, are used to pinch or bind the edges of the pages to be mounted adjacent the top surface. Without intending to be limiting, bolts, rivets, spring actuated or other resilient hinges, latches, clips or other fasteners may be used to draw the pair of clamp members together so as to securely clamp the edge of one or the corresponding edges along one side of a plurality of storage pages therebetween.

The clamp members may be of a length which provides for a snug fit when mounting perpendicularly between the opposed facing inner faces of the upper and lower retaining bars. The thickness or height of the clamps may allow one end of a pair of clamps to be positioned under the inwardly projecting retaining lip on the upper bar. A strip of releasable retaining material, such as Velcro™ hook-and-loop fastening material may be mounted on the bottom surfaces of the clamp members and the top surface of the base of the support structure for releasable mounting of the clamp on to the top surface of the base. A plurality of such pairs of clamps, together with a number of storage pages retained within the clamps, may be easily affixed or removed from mounting on the rigid support so as to be mountable into a more readily portable carrying case, caddy, wallet or the like, wherein the clamps may be retained by releasable fasteners such as clips or hook-and-loop material for example.

The storage, display and retrieval apparatus according to the present invention may have top surface of different lateral widths to different number of packets of storage pages, and may be adapted for modular mounting of one base or top surface on a support to another to thereby provide for lateral expansion of the lateral width of the top surface, for example, incorporating mating slots and ridges in the opposed edges of the top surface.

In use, the base of the flat media storage, display and retrieval device of the present invention is placed or mounted on a table, shelf, wall or other flat surface. The supporting wings are mounted into spaced apart slots in the slanted top surface on top of the base, disposed so that they diverge and are spaced apart to allow sufficient space between the wings to hold the desired number of the pairs of clamps holding the storage pages. The clamps, in the embodiment having a pair of parallel clamp members, with the storage pages mounted in the clamps, are then inserted between the opposed facing inner faces of the upper and lower retaining bars on the top shelf. Firm pressure on the clamp members down onto the top surface ensures contact between the strips of Velcro™ if employed.

The slanted top surface angularly positions the storage pages at a sloped angle relative to the horizontal, providing for display of the flat media and a convenient line of sight to the user for easy selection, retrieval or replacement of the flat media in the pages. The size of the storage pages and the corresponding size of the clamps, slots, wings and slanted top surface will, in part, be determined by the size of the individual flat media items, and the number of such items desired to be stored on each page. Consequently, particular size and scale indicated herein is by way of example and not intended to be limiting, as the various components may be larger or smaller relative to the examples given.

In summary, the system for storage, display, retrieval and transportation of flat media of the present invention includes an upper, rigid, planar member having a parallel array of apertures formed therein, and a base support adapted to support, inclined from the horizontal, the planar member so as to dispose a rear edge of the planar member elevated relative to a front edge of the planar member. The array of apertures are spaced laterally across the planar member. The apertures may be slots wherein each slot of the array of slots extends longitudinally and substantially perpendicularly between the front and rear edges. A pair of page-supporting members are releasably mountable into snug sliding engagement in a pair of the apertures or slots so as to form a divergent generally V-shaped page support cantilevered over and from the planar member.

At least one elongate clamp for releasably binding, in an elongate page-receiving cavity of the clamp, a plurality of flat media storage pages along a common side of the pages. First releasable mounting means are provided on the planar member for releasably mounting the clamps onto the planar member between the pair of page-supporting members when mounted thereon so as to dispose the page-receiving cavities of the clamps outwardly of the planar member and substantially parallel to the slots.

A transportation device having a spine and second releasable mounting means mounted to the spine is provided for releasably mounting one of the clamps to the spine so as to dispose the page-receiving cavity parallel to and outwardly of the spine. The transportation device further may include a protective cover for enclosing the flat media storage pages when bound in the clamp when the clamp and mounted to the spine.

The page supporting members may be rigid wings each having a planar page rest and, contiguous thereto, an elongate rail sized to fit in the slots. The rail and the page rest are inclined relative to one another so that, when the rail is mounted in the slots, the page rest is inclined cantilevered over the planar member by an included angle which may be substantially forty-five degrees.

The rail may be rectangular and the page rest may also be rectangular. The page rest may have a larger surface area than the surface area of the rail. The rail may substantially completely fill and snugly fit into any one of the slots.

The clamp may include a pair of elongate clamp members and means for releasably mounting the clamp members together to form the clamp cavity therebetween. The clamp members may be elongate bars having a plurality of holes formed therein for receiving fasteners therethrough to sandwich the common edges of storage pages between the bars.

The first releasable mounting means may include snap-on fit means on, and cooperating between, the bars and the planar member for a releasable snap-on fit of the bars onto the planar member. The snap-on fit means may include:

(a) notches formed in the bars so that a pair of the notches are oppositely disposed from a corresponding pair of the bars when mounted together to clamp storage pages; and, (b) mating flanges on the planar member for resiliently engaging the notches on the pair of bars.

The notches may be formed at opposite ends of each bar of the pair of bars. The mating flanges may include a laterally spaced array of the mating flanges along the front and rear edges of the planar member.

The transportation device may be a wallet sized to receive the clamp and the storage pages when folded-over. The second releasable mounting means may include second mating flanges mounted on the spine. The second mating flanges may be U-shaped clips having protrusions on the distal ends thereof for engaging the notches on the ends of the bars. The planar member may include interlocking means for modular interlocking of a laterally extending side-by-side array of the planar members whereby the system is expandable by spreading the pair of page-supporting members apart across the side-by-side array.

BRIEF DESCRIPTION OF THE DRAWINGS

FIG. 10b is, in perspective view, the clamp retaining clip of FIG. 10a.

FIG. 11 is, in section view along line 11—11 in FIG. 10a, an alternative embodiment of the embodiment of FIG. 10a.

DETAILED DESCRIPTION OF EMBODIMENTS OF THE INVENTION

With reference to the drawing figures wherein similar characters of reference denote corresponding parts in each view, the storage, display and retrieval device 10 according to one aspect of the system of the present invention, has a planar supporting top surface 12, supporting legs 14 and selectively mountable supporting wings 16.

Figure 1:
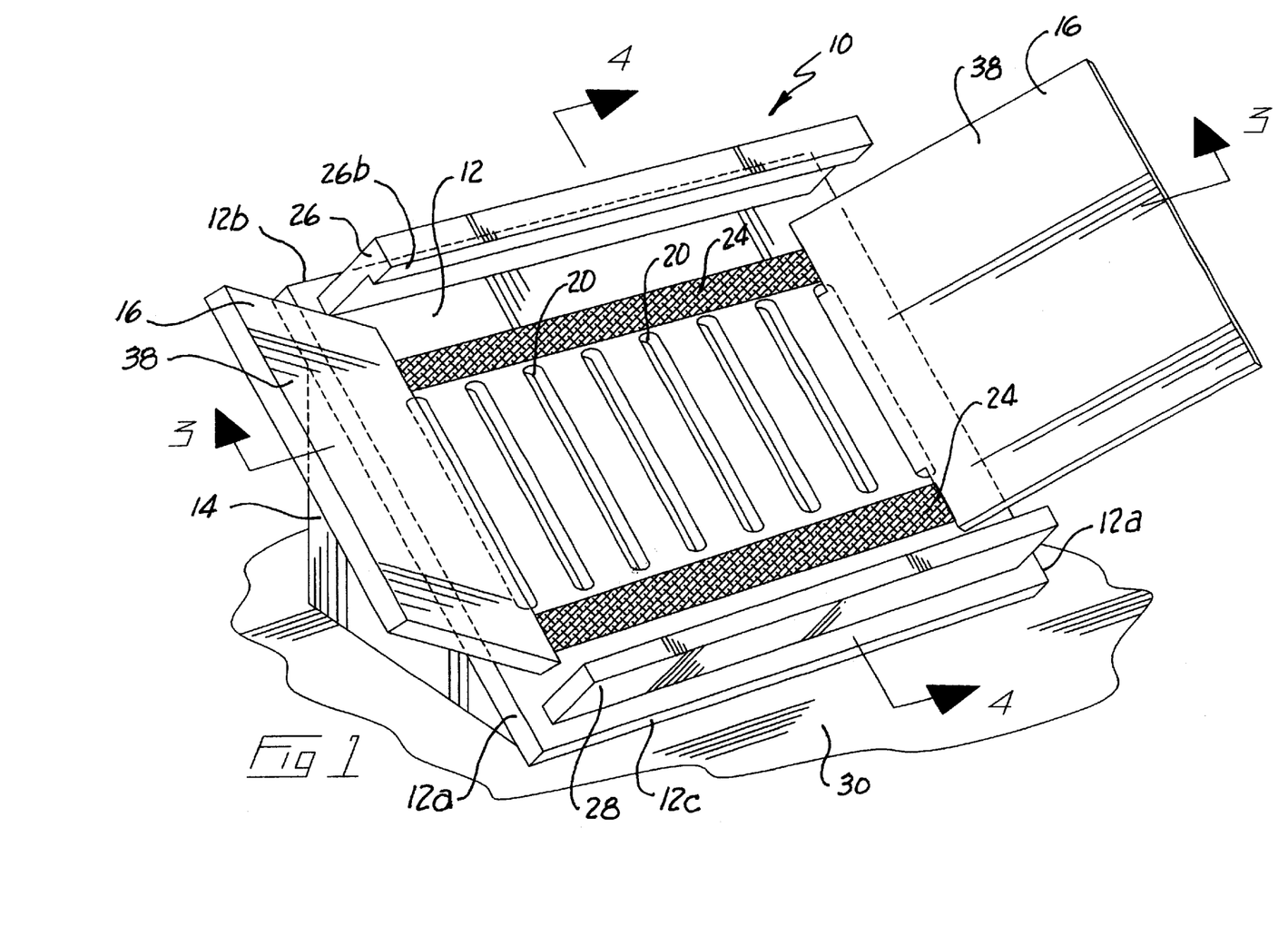
FIG. 1, is a perspective view of the storage and retrieval device with the clamps and storage pages removed for clarity.

Top surface 12 may be for example square or rectangular in shape and has a spaced apart array of generally parallel slots 20 formed in general parallel alignment with side edges 12a of top surface 12. Slots 20 terminate inwardly from upper and lower edges 12b and 12c respectively of supporting top surface 12. Affixed to surface 12 in proximity to the upper and lower terminal ends of slots 20 are Velcro™ hook-and-loop fastener strips 24.

Upper and lower retaining bars 26 and 28 respectively are mounted or formed parallel and adjacent to the upper and lower edges 12b and 12c respectively of the top surface 12. The upper bar 26 has an inwardly projecting retaining lip 26b. Top surface 12 may be strengthened or stiffened by cross-members as illustrated or otherwise as would be known to one skilled in the art, for example depending on the material from where the device is constructed, in one embodiment polycarbonate sheet.

Supporting legs 14 depend from the underside of the supporting top surface 12 and are generally triangularly shaped. The hypotenuse 14a of legs 14 support the top surface 12 at an incline of approximately thirty degrees to the surface of a table surface 30 or other supporting surface upon which device 10 rests.

Figure 6:
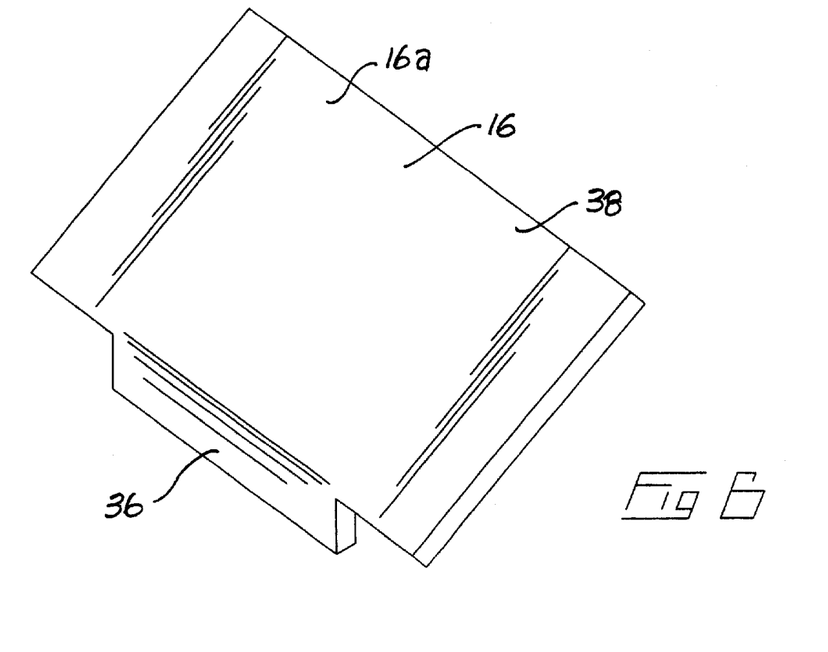
FIG. 6 is a perspective view of the supporting wing.

Supporting wings 16 are formed with a short first leg 36 and a contiguous longer second leg 38. The included angle A between legs 36 and 38 may be approximately one hundred thirty-five degrees. Leg 36 has a length which is slightly less than the length of the slots 20, a depth which permits leg 36 to extend fully through the supporting top surface and marginally below it, and a thickness sized for a snug sliding fit as leg 36 is slid through the slot. The second leg 38 of supporting wing 16 has a greater length than slot 20 so as to extend beyond it into general proximity to upper and lower retaining bars 26 and 28 respectively when wing 16 is mounted in a slot. When short first leg 36 is mounted within a slot 20, second leg 36 creates for example a forty-five degree inclined and stable supporting face 16a by projecting upwardly and diverging (relative to a second diverging wing 16) laterally outwardly from supporting top surface 12, cantilevered from the slot.

Figure 5:
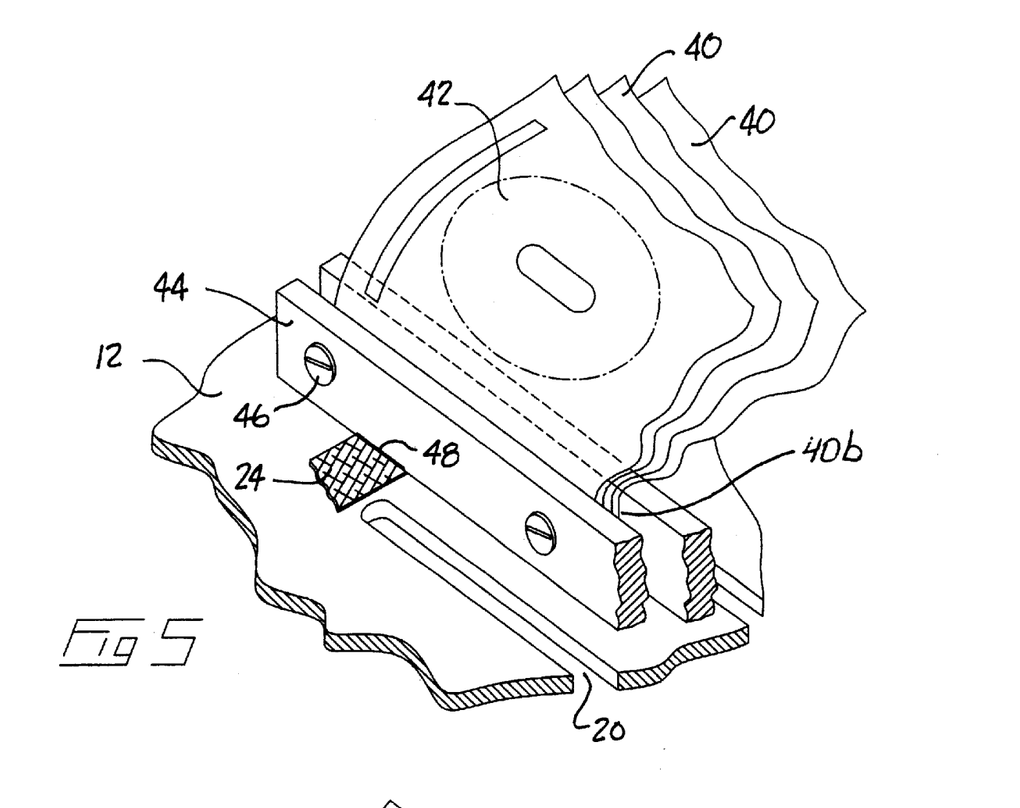
FIG. 5 is an enlarged view of a portion of the clamp and storage pages of the present invention.

A plurality of pages 40, for example such as are commonly available in the retail market, for example those manufactured by Case Logic Inc. of Longmont Colo. and marketed under the name "DVD/CD Refill Pages", have storage pockets 40a formed therein. Compact disks 42 or other flat media are stored within the pockets. Pages 40 are retained together by a binding or clamp along a common side. Clamp members 44 may be employed for this. Members 44 may be made from flat, rectangular rigid pieces of material, for example of the same material as that of the base material or of the top surface 12 material. Such material may be acrylic, plastic, wood, metal etc. Members 44 are releasably fastened together in parallel by releasable fasteners so as to sandwich the common side edges of the pages therebetween. The pages and members 44 may have binding holes therethrough to facilitate this. Bolts or rivets 46 or other fasteners may be inserted through the holes, once aligned, in clamp members 44 and pages 40. Tightening the fasteners draws the clamp members together to securely retain one or more storage pages sandwiched between the members. The fasteners may be released so that additional pages may be inserted between the clamp members. Without intending to be limiting, such other fastening devices as, rivets or spring actuated or other resilient hinges (not illustrated) may replace the bolts.

Figure 2:
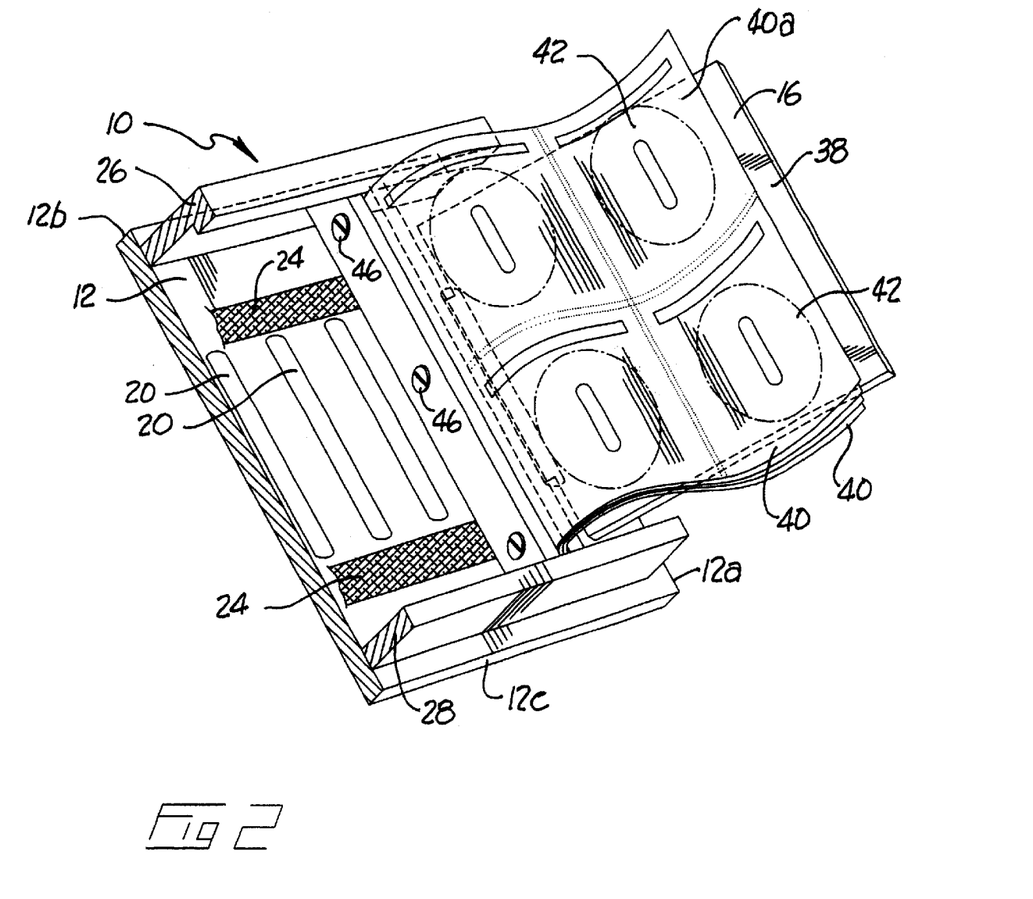
FIG. 2 is a perspective view of the storage and retrieval device, partially in section, with the clamps and storage pages in place.
Figure 3:
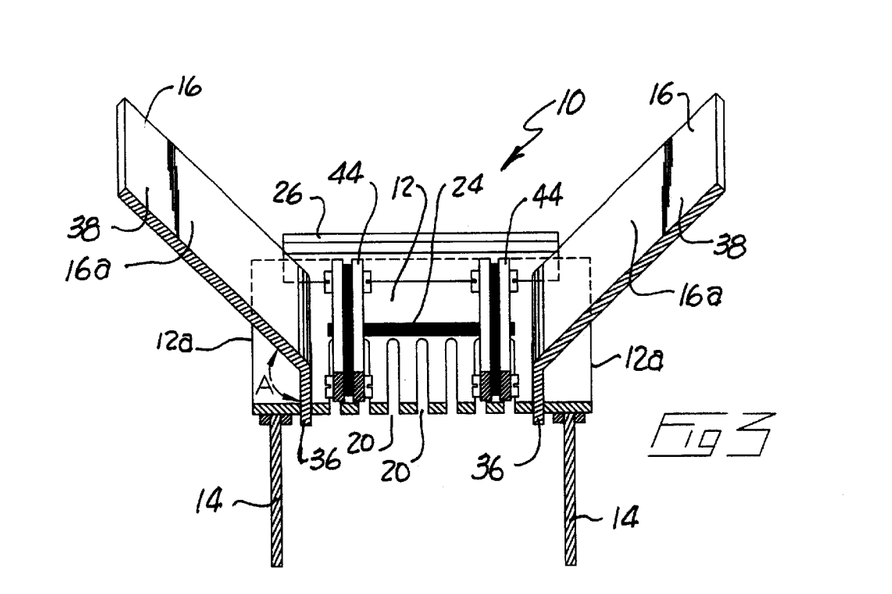
FIG. 3 is a sectional view taken on line 3—3 of FIG. 1.
Figure 4:
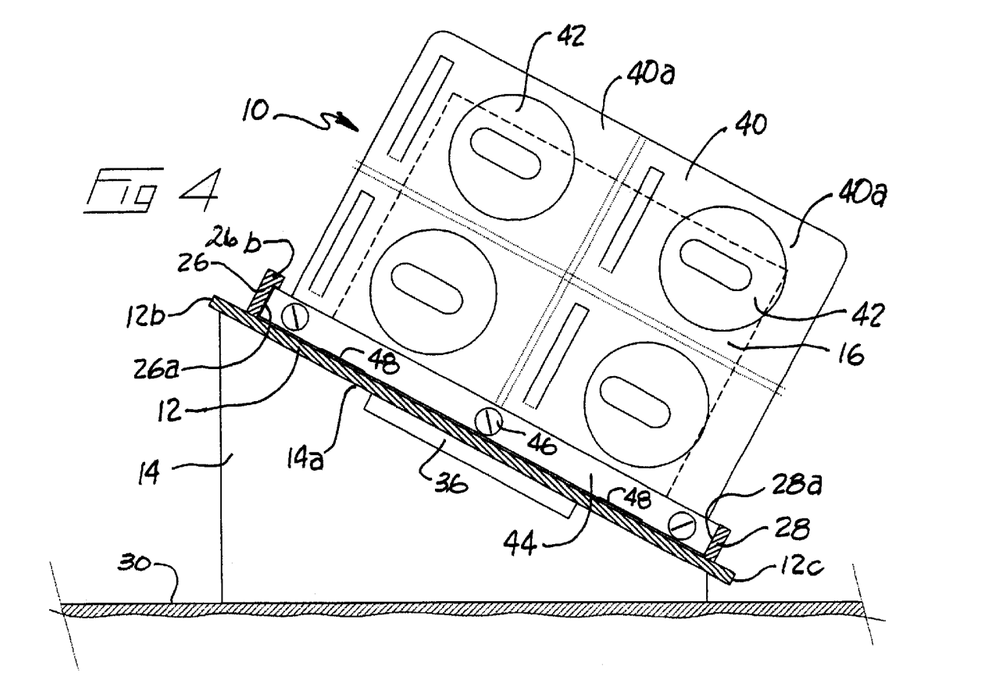
FIG. 4 is a sectional view taken on line 4—4 of FIG. 1.

Clamp members 44 are of a length which fit snugly when inserted perpendicularly between the opposed facing inner faces 26a and 28a of the upper and lower retaining bars 26 and 28 respectively. The height of one end of the clamp members correspond to the distance between the retaining lip 26b and top surface 12 so as to allow the end to be positioned snugly under inwardly projecting retaining lip 26b. A strip of hook or loop retaining material 48, such as Velcro™, may be mounted on the bottom surface of the clamp members 44 for engagement with the corresponding loop or hook retaining material 24 affixed to top surface 12.

Once supporting wings 16 have been selectively releasably mounted within slots 20, clamp members 44, clamping storage pages 40, may then be inserted between the inner faces 26a and 28a of the upper and lower retaining bars 26 and 28 respectively and firmly held in place by retaining lip 26b and by mating hook and loop fastener strips 24 and 48. Pages 40 are thereby supported in a generally outwardly biased orientation in a book-like manner by supporting faces 16a of wings 16, for display, ease of selection, and ease of retrieval of the flat media stored in the page pockets.

Figure 7:
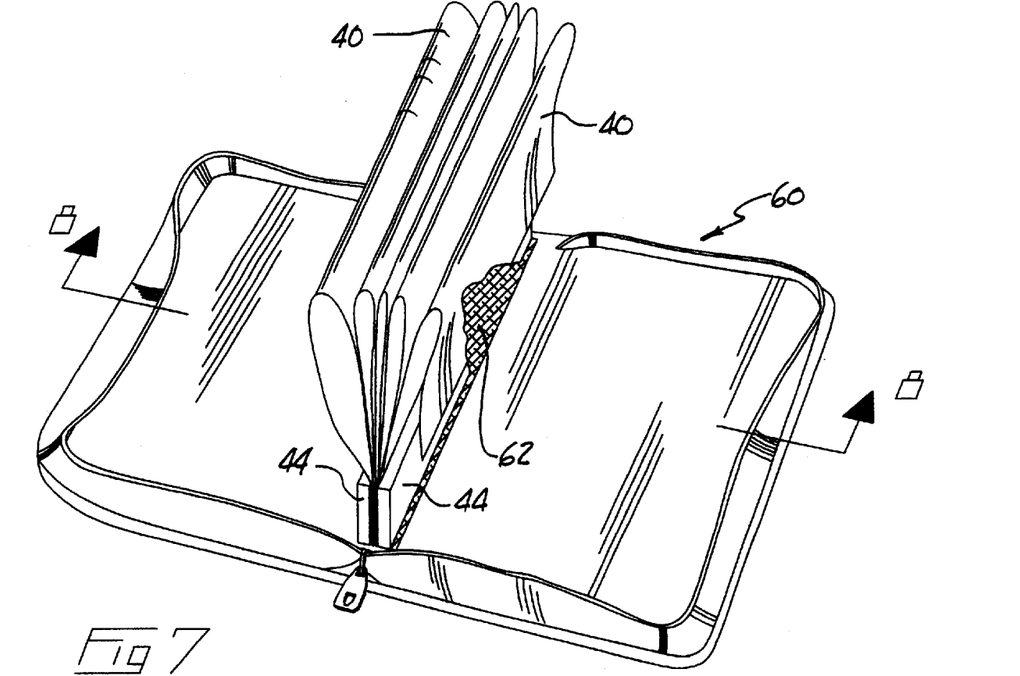
FIG. 7 is a perspective view of a transporting device within which one or more pairs of clamps together with the retained storage pages may be placed.
Figure 8:
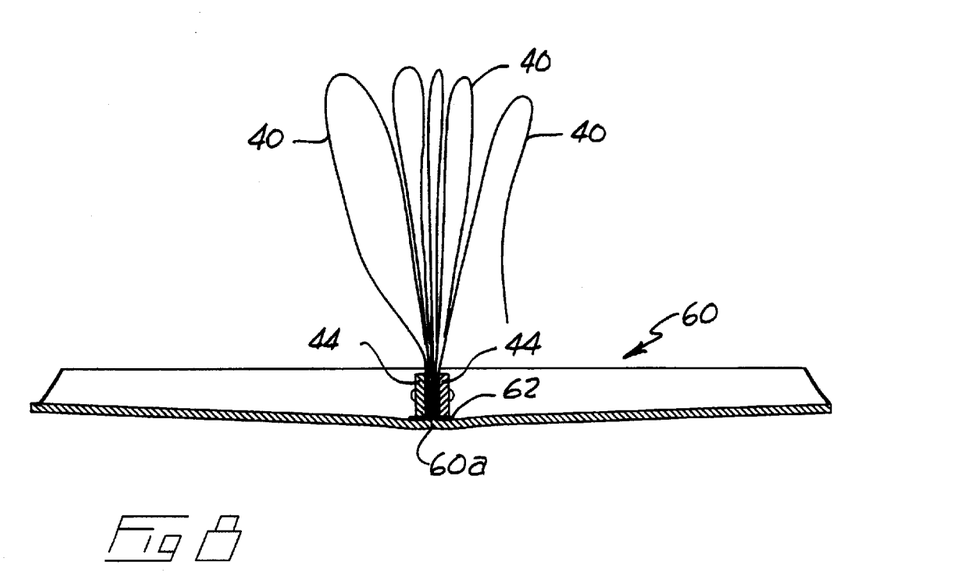
FIG. 8 is a sectional view taken on line 8—8 of FIG. 7.

With reference to FIGS. 7 and 8, the clamp members 44, along with a plurality of pages 40 which are retained therebetween, may be removed from storage device 10 and reinserted within a readily transportable and protective carrying case, pouch or wallet 60, whether soft or rigid sided, collectively and without limiting referred to herein as a transportation device. Members 44 may be releasably mounted to the spine of the transportation device by releasable mounting means such as clips or for example the illustrated hook and loop fastening strips 62 mounted along spline 60a. With members 44 mounted to spline 60a, the sides of the transporting device may be closed, book-like, so as to enclose the pages, for example once they are folded over. One or more pairs of clamping members/storage page combinations may be secured in place by adhesion between strip 62 and corresponding Velcro™ strips 48 mounted on the bottom surface of clamp members 44.

Pages 40 which are retained between clamps 44 are illustrated as having storage for four flat media storage items, such as CD's or DVD's on each side, therefore each page is illustrated as being folded along the page centreline generally parallel to clamps 44 so as to fit with the enclosure of the transporting device. Where pages accommodating storage for only two flat media storage items are utilized, such folding may be unnecessary.

The illustrated embodiments of the base unit or device 10 and the transporting device are not intended to be limiting, and the scope of the present invention is intended to include other display base and satellite carrying means wherein a convenient few or plurality of flat media storage pages are bound along a common edge by a single clamp means, where the clamp means is adapted for releasable mounting to the base and into other more readily portable caddy's having spine or spline releasable mounting means cooperating with the clamp means for storing a clamp means and its associated pages safely enclosed for travel while providing ease of access to the pages for retrieval of the flat media carried therein.

Figures 9A, 9B, 9C:
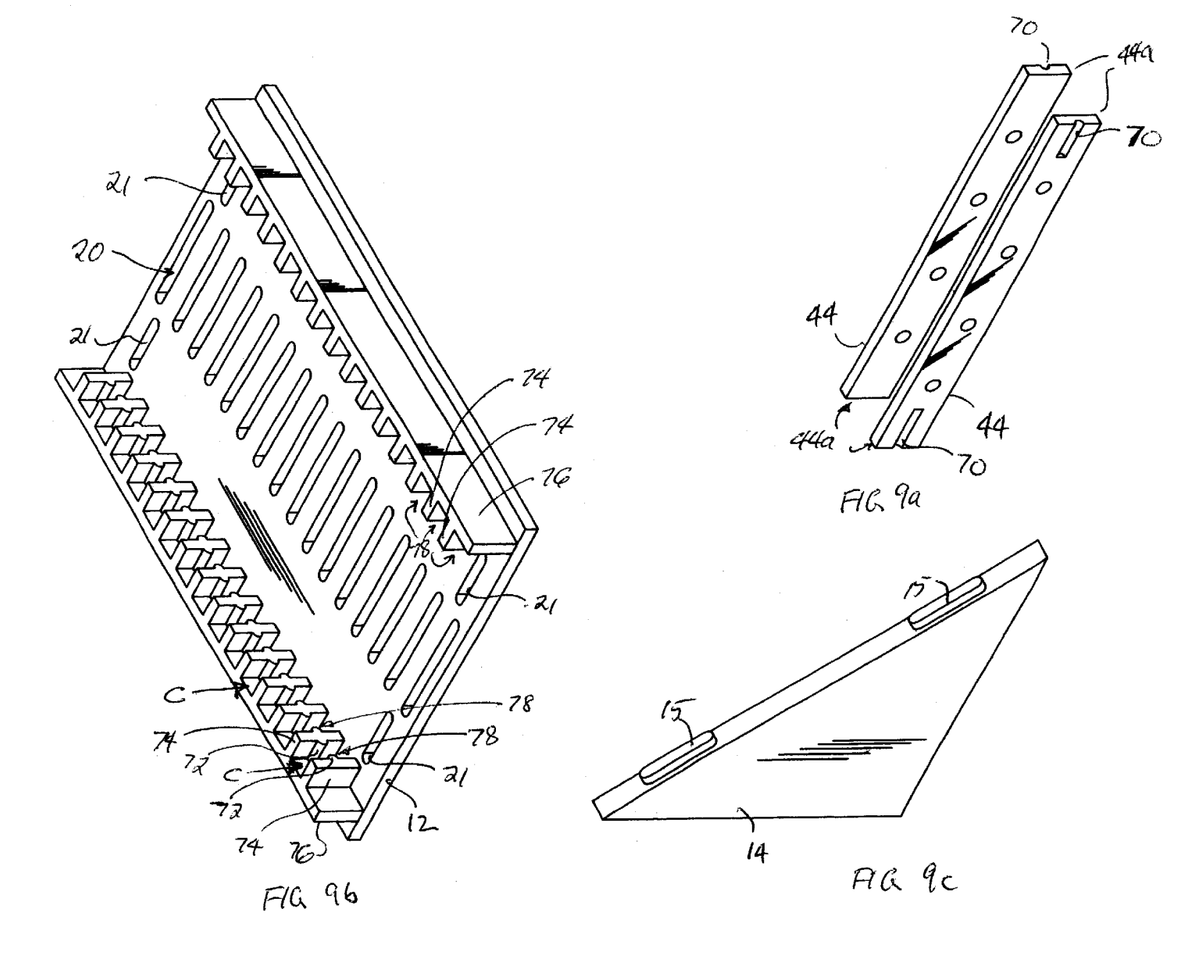
FIG. 9a is, in perspective view, a pair of clamping members used to clamp together the common side edges of a packet of flat media storage pages.
FIG. 9b is, in top perspective view, the top surface of the display stand according to one embodiment of the present invention.
FIG. 9c is, in perspective view, one of a pair of supporting legs used to support the top surface of the displaced end of FIG. 9b.

Thus in one alternative embodiment, again not intended to be limiting, as seen in FIG. 9a members 44 have notches 70 formed in each end. As before, common side edges 40b of pages 40 are clamped between a pair of members 44. The resulting clamped packet of pages is releasably mountable onto top surface 12 by a snap fit of notches 70 into female mating engagement on rounded protrusion 72 on flanges 74 as seen in FIG. 9b. Flanges 74 extend rigidly and orthogonally from both top surface 12 and top and bottom edge rails 76 mounted to top surface 12. Flanges 74 are in laterally spaced apart array so as to form opposed facing arrays of clamp receiving cavities 78 into which may be snapped ends 44a of members 44, once assembled as a clamped packet of pages 40, in direction C so as to snap notches 70 over protrusions 72.

It is to be noted that clamping pages 40 between members 44 may provide for some resiliency or flexing of members 44 at their ends 44a due to the padding of the pages between the members. This in turn provides for resilient snapping of notches 70 over and onto protrusions 72 between the rigid confines of flanges 74. Use of the snap fit of members 44 onto top surface 12 removes the need for an upper locking lip such as retaining lip 26b. As before, the short legs of wings 16 are inserted into slots. Further slots 21 are provided in top surface 12 to accommodate raised flanges or lands 15 on the hypotenuse side of legs 14, as seen in FIG. 9c, for bottom-mounting legs 14 onto the underside of top surface 12.

Figure 10A:
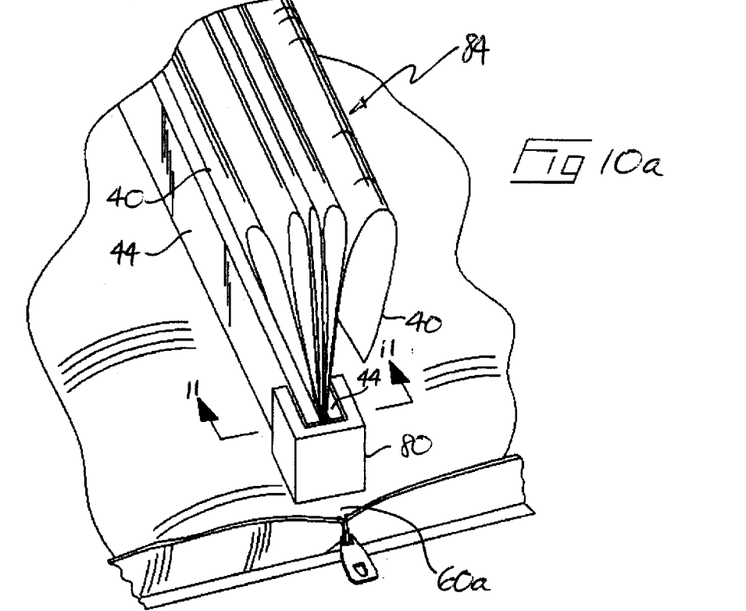
FIG. 10a is, in perspective partially cut away view, an alternative embodiment of the means for releasably mounting a clamped packet of flat media storage pages into a portable carrying wallet.
Figure 10B:
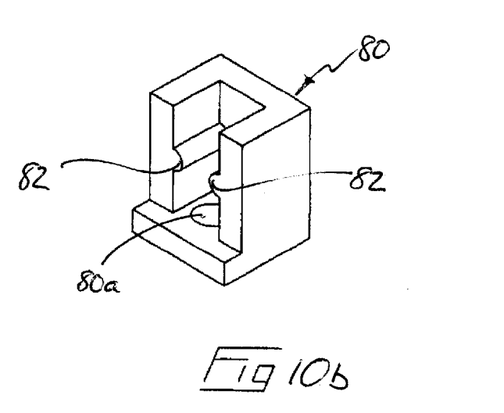
Figure 11:
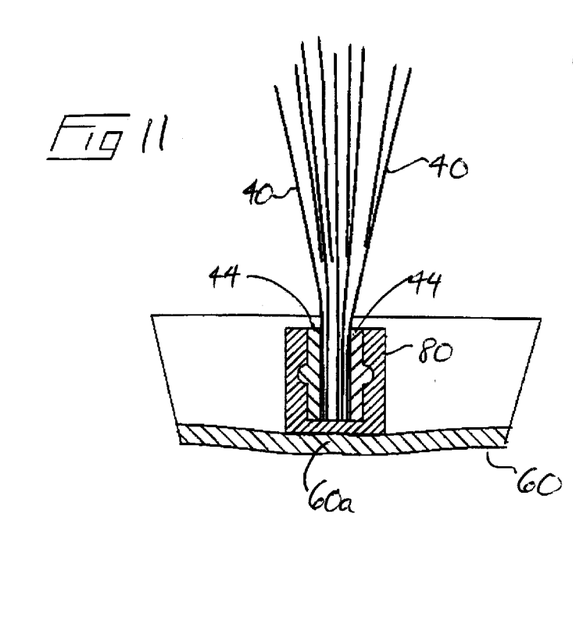

The use of notches 70 on the ends of members 44 simplifies the use of clips 80 instead of hook and loop fasteners on splines 60a of the transporting devices. As seen in FIGS. 10a and 10b, clips 80 are mounted to spline 60a of wallet 60, for example by means of fasteners (not shown) journalled through apertures 80a, so that opposed-facing rounded protrusions or bumps 82 in the clips engage notches 70 of members 44 when a pair of members 44 are mounted to form a clamped packet of pages 84. As seen in FIG. 11, the notches and protrusions may be reversed so that the notches are formed on the sides of the clip and the protrusions on members 44. This would mean of course that on flanges 74, protrusions 72 would instead be formed as notches.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for storage, display, retrieval and transportation of flat media comprising:

an upper, rigid, planar member having a parallel array of slots formed therein, a base support adapted to support, inclined from the horizontal, said planar member so as to dispose a rear edge of said planar member elevated relative to a front edge of said planar member, each slot of said away of slots extending longitudinally and substantially perpendicularly between said front and rear edges, said array of apertures spaced laterally across said planar member, a pair of page-supporting members releasably mountable into snug sliding engagement in a pair of said apertures so as to form a divergent generally V-shaped page support cantilevered over and from said planar member, an elongate clamp for releasably binding, in an elongate page-receiving cavity of said clamp, a plurality of flat media storage pages along a common side thereof, first releasable mounting means on said planar member for releasably mounting said clamp onto said planar member between said pair of page-supporting members when mounted thereon so as to dispose said page-receiving cavity of said clamp outwardly of said planar member and substantially parallel to said slots, a transportation device having a spine, second releasable mounting means mounted to said spine for releasably mounting said clamp to said spine so as to dispose said page-receiving cavity parallel to and outwardly of said spine, said transportation device further comprising a protective cover for enclosing the flat media storage pages when bound in said clamp when said clamp is mounted to said spine.

2. The system of claim 1 wherein said planar member is generally rectangular and wherein said apertures are slots, and wherein each slot of said any of slots extending longitudinally and substantially perpendicularly between said front and rear edges.

3. The system of claim 2 wherein said page supporting members are rigid wings having a planar page rest and, contiguous thereto, an elongate rail sized to fit in said slots, wherein said rail and said page rest are inclined relative to one another so that when said rail is mounted in said slots, said page rest is inclined cantilevered over said planar member by an included angle.

4. The system of claim 3 wherein said included angle is substantially forty-five degrees.

5. The system of claim 4 wherein said rail is rectangular and said page rest is also rectangular and wherein said page rest has a larger surface area than said surface area of said rail.

6. The system of claim 5 wherein said rail substantially completely fills and snugly fits into said slot.

7. The system of claim 1 wherein said clamp includes a pair of elongate clamp members and means for releasably mounting said clamp members together to form said clamp cavity therebetween.

8. The system of claim 7 wherein said clamp members are elongate bars having a plurality of holes formed therein for receiving fasteners therethrough to sandwich the common edges of storage pages between said bars.

9. The system of claim 8 wherein said first releasable mounting means includes snap-on fit means on said bars and on said planar member for a releasable snap-on fit of said bars onto said planar member.

10. The system of claim 9 wherein said snap-on fit means includes:
   (a) notches formed in said bars so that a pair of said notches are oppositely disposed from a corresponding pair of said bars when mounted together to clamp storage pages; and,
   (b) mating flanges on said planar member for resiliently engaging said notches.

11. The system of claim 10 wherein said notches are formed at opposite ends of each said bar of said pair of said bars.

12. The system of claim 11 wherein said mating flanges include a laterally spaced array of said mating flanges along said front and rear edges of said planar member.

13. The system of claim 1 wherein said transportation device is a wallet sized to receive said clamp and the storage pages when folded-over.

14. The system of claim 12 wherein said transportation device is a wallet sized to receive said clamp and the storage pages when folded-over,
   and wherein said second releasable mounting means include second mating flanges mounted on said spine.

15. The system of claim 14 wherein said second mating flanges are U-shaped clips having protrusions on the distal ends thereof for engaging said notches.

16. The system of claim 1 wherein said planar member includes interlocking means for modular interlocking of a laterally extending side-by-side array of said planar members whereby said system is expandable by spreading said pair of page supporting members apart across said side-by-side array.

* * * * *